United States Patent
Bai et al.

(10) Patent No.: US 7,264,738 B2
(45) Date of Patent: Sep. 4, 2007

(54) METHOD FOR KILLING ORGANISMS IN THE COURSE OF CONVEYING BALLAST WATER IN SHIPS AND APPARATUS THEREOF

(75) Inventors: Mindong Bai, Dalian (CN); Xiyao Bai, Dalian (CN); Xiaojian Zhou, Dalian (CN); Zhitao Zhang, Dalian (CN); Mindi Bai, Dalian (CN); Bo Yang, Dalian (CN); Chengwu Yi, Dalian (CN)

(73) Assignee: Dalian Maritime University, Ganjingzi Dist. Dalian (CN)

( * ) Notice: Subject to any disclaimer, the term of this patent is extended or adjusted under 35 U.S.C. 154(b) by 0 days.

(21) Appl. No.: 10/864,966

(22) Filed: Jun. 10, 2004

(65) Prior Publication Data

US 2004/0251215 A1    Dec. 16, 2004

(30) Foreign Application Priority Data

Jun. 13, 2003    (CN) .............................. 03 1 33447

(51) Int. Cl.
*C02F 1/78*    (2006.01)
(52) U.S. Cl. ............... 210/748; 210/759; 210/760; 210/764; 205/701; 205/756
(58) Field of Classification Search ............ 210/748, 210/749, 764, 198.1, 192, 758, 760, 759; 422/186.04, 186.07, 186.12; 205/701, 756
See application file for complete search history.

(56) References Cited

U.S. PATENT DOCUMENTS

| | | | | |
|---|---|---|---|---|
| 6,125,778 A * | 10/2000 | Rodden | ................ | 114/74 R |
| 6,171,508 B1 * | 1/2001 | Browning, Jr. | ............ | 210/750 |
| 6,402,965 B1 * | 6/2002 | Sullivan et al. | ............ | 210/748 |
| 6,761,123 B2 * | 7/2004 | Husain et al. | ............ | 114/74 R |
| 6,773,607 B2 * | 8/2004 | Russell | ................ | 210/747 |
| 7,008,596 B1 * | 3/2006 | Rump et al. | ............ | 422/186.07 |
| 2003/0015481 A1 * | 1/2003 | Eidem | ................ | 210/760 |
| 2003/0196967 A1 * | 10/2003 | Robinson et al. | .......... | 210/760 |

OTHER PUBLICATIONS

Report: "Ozone, Seawater and Aquatic Nonindigenous Species: Testing a Full-Scale Ozone Ballast Water Treatment System on an American Oil Tanker" William J. Cooper et al., May 6, 2002.
"Challenges in global ballast water management" Marine Pollution Bulletin 48, 2004.

* cited by examiner

*Primary Examiner*—Matthew O. Savage
(74) *Attorney, Agent, or Firm*—Westman, Champlin & Kelly, P.A.

(57) ABSTRACT

The present invention relates to gaseous discharge and applied biotechnology. In particular, the present invention relates to a method for killing organisms in the course of conveying ballast water in ship, comprising applying a voltage with frequency of 400-40000 Hz between the anode electrode and the cathode electrode of the free radical generator, thereby forming strong ionization discharge of electric field strength of 250-600 Td between the anode electrode and the cathode electrode, ionizing, dissociating, and exciting $O_2$ and $H_2O$, or $O_2$, processing into active particles comprising $O_3$, OH. and $HO_2$, dissolving excitedly to obtain free radical solution mainly consisted of OH, adding the free radical solution to conveying pipeline of ballast water, conveying for 2-20 s in the pipeline, thereby killing organisms of ballast water selected from the group consisted of bacteria, single cell alga, and protozoan.

9 Claims, 2 Drawing Sheets

METHOD FOR KILLING ORGANISMS IN THE COURSE OF CONVEYING BALLAST WATER IN SHIPS AND APPARATUS THEREOF

The present application is based on and claims the benefit of Chinese patent application Serial No. 03133447.4, filed Jun. 13, 2003, the content of which is hereby incorporated by reference in its entirety.

FIELDS OF THE INVENTION

The present invention relates to the fields of gas discharge, plasma chemistry and molecule biology, in particularly, a method for killing introduced organisms in the process of conveying ballast water of ships and apparatus thereof.

BACKGROUND OF THE INVENTION

In $70^{th}$ decade last century, North American comb jelly invaded Caspian Sea and they ate plankton, fish berry and fry, which brought a big calamity to anchovy and herring breeding. In 1990, mnemiopsis, a kind of American organism, invaded Caspian Sea and swallowed a large amount of plankton causing nearly exhaustion of fish fry in Caspian Sea. In 1997, AQIS estimated that over 170 kinds of marine organisms invaded Australian water area. For example, Dinoflagellate caused a loss of 80 million USD. By entering the human foodstuff chain via mollusks they endangered the human health causing a quite long time discontinuity of Australian fishery industry. In 1996, there were 130 kinds of organisms invaded the Great Lakes in the boarder region between U. S. A and Canada. Up to the year of 2000, economic loss of 5 billion USD has inflicted. Asia EITor, Inaba is also brought to Latin America via ballast water of the ship. Invasion of foreign organisms via ballast water of ships will definitely bring disastrous destruction to the environment of Chinese offshore area and threaten the basis of sustainable development in our country's rapidly developing regions.

At present, many researchers are researching for an effective novel method to counteract the invasion of harmful organisms from ballast water of ships in order to solve the problem of regional limitation and obstacle to trade. In 1990, fishery organization of Great Lakes and international union proposed measures to decrease the invasive spread of organisms by replacing ballast water in international waters. This measure could effectively lower or hinder the invasion of foreign organisms. However, replacement of ballast water in deep sea could not effectively and completely remove all the organisms that cover a huge range of species. In 2000, IMO Protection Committee on Environment of Sea proposed "method of replacement of ballast water in deep sea (2000 meters below the sea level, farther than 200 nautical miles from shore)". The method, however, had the drawbacks of high consumption of energy and requiring of long operating time. In 2000, Geoff Rigby et al carried out respectively the researches on heating the ballast water, respectively. Even though the method was considered to be of potential attraction, it still has drawback of long operating time, high energy consumption and in addition formation of thermal stress which would lower the safety of cruise. Many scientists used chlorine and sodium hypochlorite to treat the ballast water. In order to kill micro-organism and to ensure the chemicals homogeneously dispersed in the ballast water, excess amount of 100-500 mg/L of chlorine should be added which was scores of times of the amount used in common water treatment and as a result corrosion of facilities of cabin coating, pumps, pipes and the like would be aggravated. Further more, chlorine would react with organic matters in the ballast water forming carcinogenic organic chloride and the storage of several tons of liquid chlorine in the vessel would induce safety problem of leakage and explosion. Due to the above reasons, it is not feasible to apply this method to the treatment of ballast water. Early in 1998, Smethurst proposed to re-evaluate the feasibility of using chlorine in the treatment of ballast water. Many scientists also carried out a large amount of exploratory research works while MEPC and GloBallast were of the opinion that at the present there was not yet any effective method for on-line treatment of ballast water. Currently, available methods comprise: (1) water is replaced during cruise; (2) replacement of ballast water is carried out on shore of destinative harbor. The former has problems of safety and high consumption of energy while the latter has problems of investment by the local government, maintenance and management of harbor facilities.

DISCLOSURE OF THE INVENTION

The objective of the present invention is to overcome the shortcomings of conventional methods to provide a simply operating and inexpensive method and apparatus capable of improving quality of ballast water, killing invasive marine species in the process of conveying ballast water and without any residual chemical reagent. The novel method is based on the strong ionization discharge to process $H_2O$ and $O_2$ in the molecular level into high concentration activated particles such as hydroxyl radical (OH.), ozone ($O_3$). When the OH. solution is injected into the main conveying pipe of ship's ballast water, invasive marine species are killed and on-line treatment of ballast water is realized.

The present invention provides a method for killing organisms in the course of conveying ballast water of ship, comprising applying a voltage with frequency of 400-40000 Hz between a discharge electrode and an earthing electrode of free radical generator, thereby forming a strong ionization discharge of electric field strength of 250-600 Td, forming activated particles of $O_3$, OH, and $HO_2$. using ionization and dissociation of $O_2$ or $H_2O$, excitably dissolving to produce free radical solution mainly consisting of OH, injecting the free radical solution to a conveying pipeline of ballast water, conveying for 2-20 s in the pipeline, thereby killing organisms in the ballast water.

The organisms mainly include bacteria, phytoplankton (single cell alga), and protozoan.

According to the present invention, $O_3$ (ozone) is dissolved into excited water or seawater activated by some injectors resulting in a chain reaction to form free radical solution mainly consisting of OH.. The free radical solution further is composed of $HO_2$, $HO_3$, $O_3$, $O_3.^-$, $O_2.^-$, and $H_2O_2*$.

According to the present invention, the frequency between the discharge electrode and the earthing electrode of the free radical generator is preferably 4000-10000 Hz, more preferably 6000-8000 Hz.

According to the present invention, the ballast water is treated by an apparatus for killing organisms of ballast water in ship. ¼ to ¹/₂₀ of the ballast water is taken out main pipeline for conveying ballast water, excitably dissolved to produce the free radical solution mainly consisting of OH, and returned to the pipeline. The duration for killing organisms in the process of conveying ballast water is preferably 2 s-10 s.

According to the present invention, the free radical solution is formed by injector, vortex impeller pump, and dissolution.

The present invention also provides a apparatus of carrying out the method for killing organisms in the process of conveying ballast water of ship, comprising a frequency conversion power supply, an injector, a gas liquid dissolution separator, a liquid-liquid mixer, a residual free radical eliminator, wherein a free radical generator is installed between the injector and feeding gases.

The free radical generator comprises a discharge electrode, an earthing electrode, dielectric layers and septums.

According to the present invention, a dielectric layer is adhered to the surfaces of the discharge electrode and the earthing electrode, or a interspace of discharge gap. The materials of the dielectric layer are porcelain, glass or enamel. The discharge electrode, earthing electrode and dielectric substance layer are in the form of tube or plate.

Plasma reaction processes of the present invention are as follows:

1. Plasma processes of hydroxyl radical (OH.) formation.

In discharge reactor for which the electron mean energy is low (<6 eV) with weak ionization discharge, the OH. radicals are produced by the following reactions:

Electron attachment:

$H_2O+e \rightarrow H^-+OH.$

Direct dissociation by electron impact:

$H_2O+e \rightarrow H.+OH.+e$

Dissociation by O($^1$D):

$O_2+e \rightarrow O(^1D)+O(^3P)$ $O(^1D)+H_2O \rightarrow 2OH.$

When the electron mean energy is high with strong ionization discharge, OH. come mainly from the ionization of $O_2$ with $H_2O$ into water cluster ions as follows.

Electron-impact ionization:

$O_2+e \rightarrow O_2^++2e$ $O_2+e \rightarrow O^++O.+2e$ and similar ionization processes to produce molecular ions and ions $N_2^+$, $H_2O^+$, $N^+$, $H^+$, charge transfer reactions to form additional $O_2^+$ ions such as:

$N_2^++O_2 \rightarrow N_2+O_2^+$

Formation of water cluster ions (M: third body):

$O_2^++H_2O+M \rightarrow O_2^+(H_2O)+M$

Dissociative reactions of water cluster ions to form OH.:

$O_2^+(H_2O)+H_2O \rightarrow H_3O^++O_2+OH.$ $O_2^+(H_2O)+H_2O \rightarrow H_3O^+(OH)+O_2$ Followed by $H_3O^+(OH)+H_2O \rightarrow H_3O^++H_2O+OH.$ With the weak ionization discharge, the injection of per 100 eV energy into the discharge electric field is possible to produce 0.3~0.4 molecules of OH.. With the strong ionization discharge, per 100 eV energy injected into the discharge electric field is possible to produce 2.8 molecules of OH.. The injection of per 100 eV energy is possible to make 2.70 water cluster ions to form OH.. Therefore the strong ionization discharge is more effective in producing larger numbers of OH. radicals.

2. Formation of OH. radicals by $O_3$ with excited water is as follows:

Water is transiently cavitated into micro air bubbles when it quickly flows through Venturi injector or vortex impeller pump, The micro bubbles will rapidly expand, shrink to "an explosion process" when its diameter is reduced to a specific value. In the instant of bubble break, water molecule is excited to produce radicals with the rapid increases of temperature and pressure of air bubble (T>3000 k, P>1 kMPa). The radical concentration is about $10^{-9}$ (V/V). The amount of OH. produced by excited water is quite small not to be main reaction.

Direct dissociation of excited water by electron impact:

$H_2O.+e \rightarrow H.+OH.+e$

OH. come mainly from high-concentration ozone with excited water, the concentration is up to 10 mg/L or more. The plasma reaction processes are as follows:

$O_3+H_2O. \rightarrow O_2+H_2O_2.$ $H_2O_2. \rightarrow 2OH.$ $O_3+e \rightarrow O.+O_2+e$ $O.+H_2O \rightarrow 2OH.$ $O_3+H_2O \rightarrow O_2+H_2O_2.$ $H_2O_2. \rightarrow H^++HO_2^-$ $H_2O_2.+H_2O \rightarrow HO_2^-+H_3O^+$ $O_3+HO_2^- \rightarrow HO_2.+O_3.^-$ $HO_2. \rightleftharpoons H^++O_2.^-$ $HO_2^-+O_3 \rightarrow O_2+O_2.^-+OH.$ $O_2.^-+O_3 \rightarrow O_2+O_3.^-$ $H_2O_2+O_2.^- \rightarrow O_2+OH^-+OH.$ $O_3.^-+H^+ \rightarrow HO_3.$ $HO_3. \rightarrow O_2+OH.$ $O_2.^-+HO_3. \rightarrow 2O_2+OH^-$ The above-mentioned plasma reaction processes indicate that it is an effective method for the formation of OH. radicals using ozone dissolved into excited water.

2. Process for dissolution of free radical:

The dissolution of free radical follows Henry's law. The rate of dissolution of free radical can be expressed by the following equation:

$$C_L^* = \frac{1}{H_A} C_G$$

Where $C_L^*$ is the equilibrium concentration of free radical solution, which expresses the maximum concentration of free radical in water in equilibrium conditions (also called saturation concentration). $C_L^*$ is correlated to some parameters such as temperature of solution, partial pressure of free radical in gas phase (concentration of free radical in gas phase), gas/liquid ratio and so on.

$$\upsilon = k_L \cdot a \cdot (C_L^* - C_L) - k_d C_L$$

Therefore, it is possible to raise the dissolution speed to enhance the effective dissolution of free radical in water by increasing the liquid phase mass transfer efficiency of free radical $k_L \cdot a$, expanding the gas liquid contact area and raising the free radical concentration in gas phase.

3. Biochemical processes of killing introduced organisms by hydroxyl radical:

The main processes involved in killing introduced organisms by hydroxyl radical comprise lipid peroxidation, oxidation and decomposition of amino acids, change of protein structure, break of DNA chain and decoloration of photosynthetic pigment.

(1) Lipid peroxidation: Under the action of hydroxyl radical, a series of reactions occur such as break of lipid-bond, break and hydrolyzation carbon chain of unsaturated fatty acid and so on. Finally the carboxylic acid decomposed from phosphoglycerides is decarboxylated to $CO_2$ and $H_2O$.

(2) Oxidation and decomposition of amino acids: Amino acids are oxidized and decomposed by hydroxyl radical shown in following reaction:

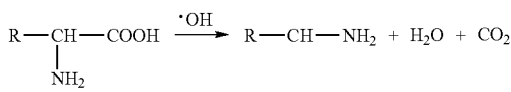

(3) Protein structure change: Hydroxyl radicals make the disulfide bond be oxidized and broken to change the space structure of protein, resulting in the proteins to be denaturalized or the enzymes to lose the activity finally the cell death.

(4) DNA chain break: Hydroxyl radicals combine with DNA to form DNA adducts, which is a forepart damage of DNA, resulting in some changes in DNA structure such as the alkaline radical replacement and loss, the chain break and so on. The alkaline radical or the glucide and the phosphoric acid in DNA are attacked with hydroxyl radicals to form the chemical damages. Then the structure and function of DNA are affected leading to the cell death.

(5) Decoloration of photosynthetic pigment: Hydroxyl radicals decolorate the pigment of photosynthetic microalgae and other photosynthetic organisms, which hinders their assimilation synthesis resulting in the death of invasive organisms.

The present invention has following beneficial effects:

1. Hydroxyl radicals is feasible to kill the phytoplankton (single cell alga), protozoan, spore, bacteria, vibrio in ship's ballast water with low concentration (0.6-0.7 mg/L).

2. The duration for killing introduced organisms is extremely short (approximately 2.8 s). Invasive marine species can be killed in the process of conveying ballast water.

3. The feeding gases for producing hydroxyl radical are oxygen and water at gas state, which is nearly no costing.

4. The residual hydroxyl radical decomposes into $H_2O$ and $O_2$ without any residue.

5. The quality of ship's ballast water is improved.

6. The apparatus of hydroxyl radical has some advantages such as small volume, simply operation and low running cost.

7. With the method of strong ionization discharge, hydroxyl radicals are directly produced using the ionization and dissociation of air, oxygen and water (or sea water). The bacteria, phytoplankton (single cell alga), protozoan, spore and vibrio, are killed finally to be decomposed into $H_2O$, $O_2$, and inorganic salt with zero pollution and zero discharge. Therefore, hydroxyl radicals with high-concentration and large yield can solve the problem of Invasive marine species of ship's ballast water.

DESCRIPTION OF THE FIGURES

The present invention will be further described with reference to Figures and Examples.

In FIG. 1, the numbers indicate the following parts respectively: 1. Pump, 2. Flowmeter, 3. free radical generator, 4. Monitor of free radical concentration, 5. Transformer, 6. Inverter, 7. Controller, 8. Pump, 9. Injector, 10. Gas/liquid separator, 11. Electric valve, 12. Check valve, 13. Eliminator of residual free radical, 14. Monitor of dissolved OH..

In FIG. 2, the numbers indicate the following parts respectively: 15. Unit for generating hydroxyl radical solution, 16. Filter, 17. Flowmeter, 18. Valve, 19. Pump, 20. Liquid/liquid mixer.

In FIG. 3, the numbers indicate the following parts respectively: 21. Earthing electrode, 22. Discharge electrode plate (discharge electrode+dielectric layer), 23. Septum, 24. Dielectric layer.

EXAMPLES

Figure 1:
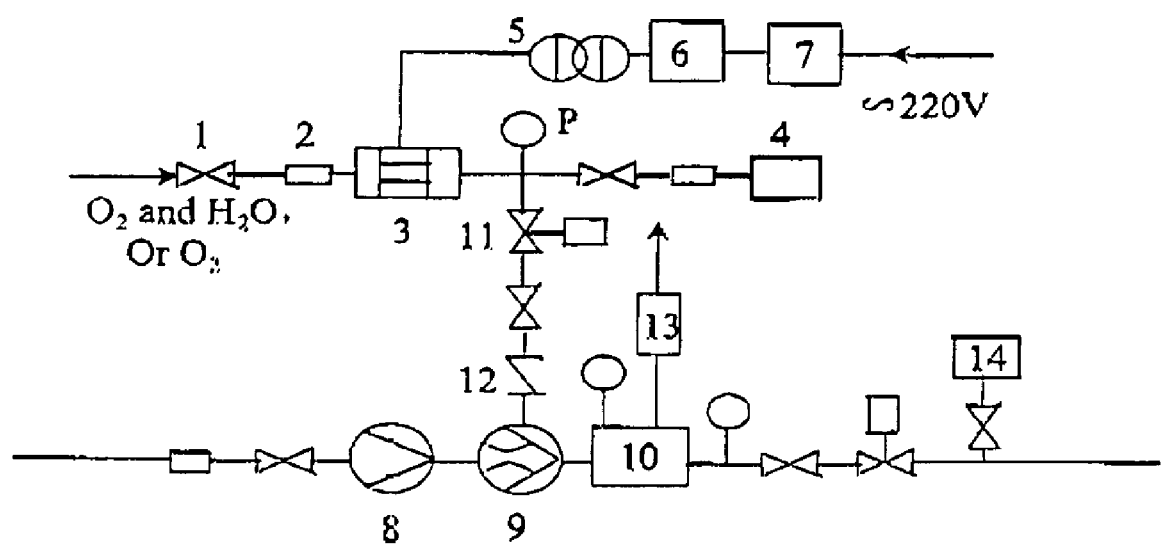
FIG. 1 is a schematic diagram of apparatus for producing hydroxyl radical and hydroxyl radical solution of the present invention.
Figure 2:
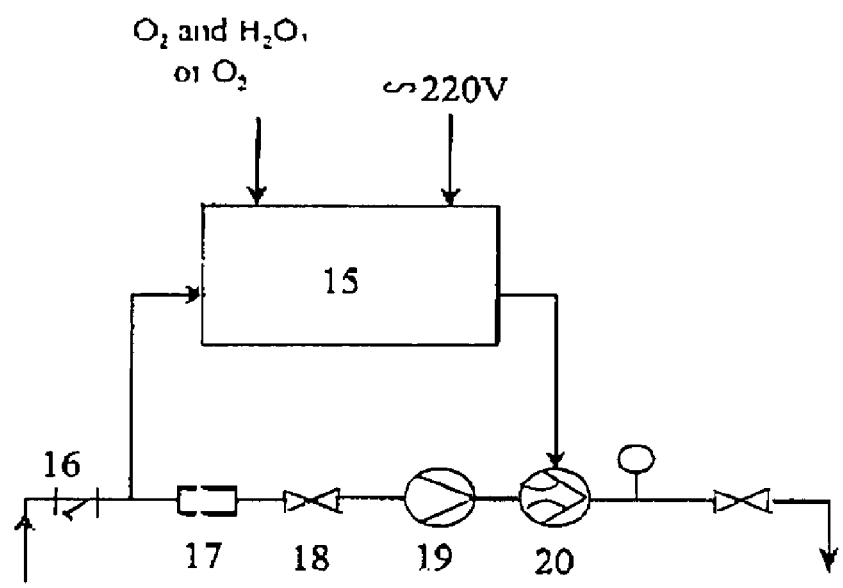
FIG. 2 is a process diagram for killing the introduced organisms in the process of conveying ballast water in ship of the present invention.
Figure 3:
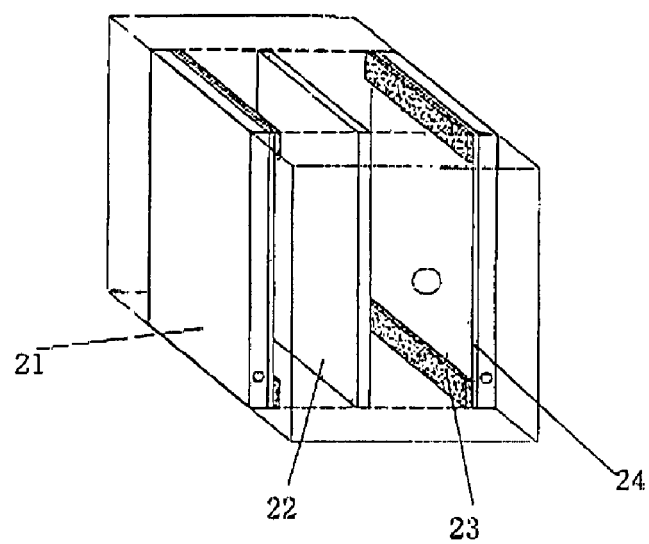
FIG. 3 is a structure diagram of hydroxyl radical generator.

Free radical generator 3 of the present invention was composed of discharge electrode 22, earthing electrode 21, dielectric substance layer 24 and septum 23. Strong electric field of 250-600 Td was formed between the discharge electrode and earthing electrode. As showed in FIG. 1, after passing through valve 1 and flow meter 2, $O_2$ and $H_2O$, or $O_2$ molecules were processed into free radicals comprising OH, $O_3$, $HO_2$. in free radical generator 3, which were controlled by Electric valve 11 and Check valve 12. Then these free radicals and the untreated ballast water suctioned by pump 8 were processed into hydroxyl free radical solution in injector 9 and gas/liquid separator 10. And the undissolved free radicals were removed by Eliminator of residual free radical 13. High frequency power supply made from transformer 5, invertor 6 and controller 7 was used to supply power to free radical generator 3. Free radical concentration measuring apparatus 4 was used to measure the concentration of free radical produced while the dissolved OH. monitor 14 was used to measure the concentration of hydroxyl radical solution. Untreated ballast water, suctioned by pump 19 into conveying pipe and filtered by filter 16 (FIG. 2), was taken out partly and processed into hydroxyl radical solution by unit for generating hydroxyl radical solution 15, which was then mixed in liquid/liquid mixer 20 with ballast water flowing through flow meter 17 and valve 18 in conveying pipe. The effect of the elimination of phytoplankton (single cell alga), protozoans and bacteria was shown in Table 1.

TABLE 1

Results of the Test of Elimination of Bacteria and Protozoan Seawater

| Species | OH˙ concentration (mg/L) | Organism content (count/mL) | Kill efficiency (%) |
|---|---|---|---|
| Bacteria | 0 | $1.9 \times 10^5$ | |
| | 0.63 | not detectable | 100 |
| Alga | 0 | $6.0 \times 10^4$ | |
| | 0.63 | not detectable | 100 |
| Protozoan | 0 | $4.4 \times 10^4$ | |
| | 0.63 | not detectable | 100 |

Figure 4:
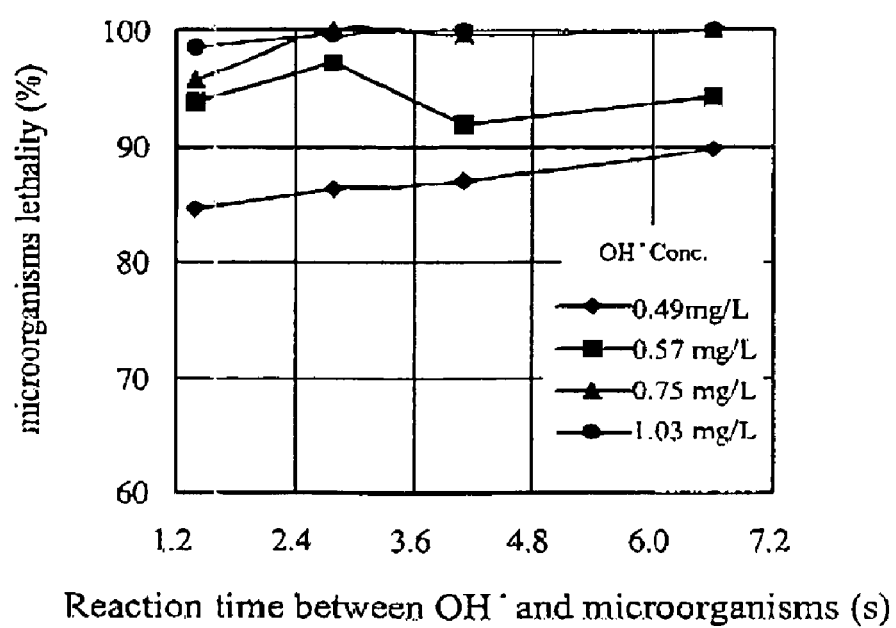
FIG. 4 shows the relationship between the kill duration of introduced organisms by hydroxyl radical and the kill efficiency.

The time necessary for elimination of phytoplankton (single cell alga), protozoan, bacteria and so on was extremely short. From the curve of relationship between times needed for elimination of microorganism by hydroxyl radical and the lethality in FIG. 4, the time needed was about 4 s. Some experiment indicated that the time needed for 100% elimination of bacteria, phytoplankton (single cell alga), protozoan, spore and vibrio was 2.8 s. With our method, killing of organisms in the ballast water in the course of transporting ballast water in ship can be realized, so gigantic facilities such as oxidation tower (contact tower) and aeration tank can be omitted.

The residual hydroxyl radicals were decomposed into $H_2O$, $O_2$ and no any residual chemical reagent left after 20 minute. At the same time, the quality of the ballast water was improved as shown in Table 2. Therefore, the method for treating ballast water by using hydroxyl radicals solution is a green and effective method.

TABLE 2

Influence of OH˙ on quality of ballast water

| Test Item | OH˙ solution (mg/L) 0 | 0.63 | Change rate (%) |
|---|---|---|---|
| Nitrate | 156.8 μg/ | 184.1 μg/L | +17.4 |
| Nitrite | 66.6 μg/L | 1.1 μg/L | −98.4 |
| Ammonium salt | 79.8 μg/L | 0.4 μg/L | −99.5 |
| Phosphate | 25.9 μg/L | 32.9 μg/L | +27.0 |
| As | 0.44 μg/L | 0.43 μg/L | −2.3 |
| Cu | 4.2 μg/L | 2.6 μg/L | −38.1 |
| Zn | 17.2 μg/L | 68.6 μg/L | +298.8 |
| Cd | 0.8 μg/L | 0.7 μg/L | −12.5 |
| Pb | 6.5 μg/L | 1.6 μg/L | −75.4 |
| Fe | 14.4 μg/L | 8.6 μg/L | −40.3 |
| Hg | 0.033 μg/L | 0.031 μg/L | −6.1 |
| TOC | 1.68 mg/L | 2.39 mg/L | +42.3 |
| COD | 0.54 mg/L | Not detectable | −100 |
| DO | 7.47 mg/L | 13.24 mg/L | +77.2 |
| Salinity | 31.351 | 31.349 | 0 |
| pH | 8.13 | 8.12 | −0.1 |
| Turbidity | 0.4 | 0.2 | −50.0 |
| Conductance | 47.3 | 47.58 | +0.6 |

What is claimed is:

1. A method for killing organisms in the process of conveying ballast water of a ship, comprising
applying a voltage with a frequency of 400-40000 Hz between a discharge electrode and an earthing electrode of a free radical generator, thereby forming a strong ionization discharge of an electric field strength of 250-600 Td,
forming activated particles of $O_3$, OH, and $HO_2$ by ionization and dissociation of $O_2$ and $H_2O$ in said strong ionization discharge,
excitately dissolving the activated particles into the ballast water to produce free radical solution comprising of OH,
injecting the free radical solution to a conveying pipeline of ballast water, conveying the injected free radical solution and ballast water for a period of 2-20 s in the pipeline, thereby killing organisms in the ballast water.

2. The method according to claim 1, wherein the organisms are selected from the group consisting of bacteria, single cell alga, protozoan, spore and vibrio.

3. The method according to claim 1, wherein the activated particles of $O_3$, OH and $HO_2$ is dissolved into seawater activated by an injectors causing a chain reaction to produce the free radical solution comprising of OH.

4. The method according to claim 1, wherein the free radical solution further comprises $HO_2$, $HO_3$, $O_3$, $O_3^-$, $O_2^-$, and $H_2O_2^*$.

5. The method according to claim 1, wherein the frequency of the voltage between the discharge electrode and the earthing electrode is between 4000 and 10000 Hz.

6. The method according to claim 1, wherein the ballast water is treated by an apparatus for performing said method that is disposed in the ship.

7. The method according to claim 1, wherein ¼ to 1/20 of the ballast water is taken out of a main pipeline for conveying ballast water and excitably dissolved with the activated particles to produce free radical solution mainly consisting of OH, and returned to the pipeline.

8. The method according to claim 1, wherein the period for killing organisms in the process of conveying ballast water is between 2s and 10s.

9. The method according to claim 1, wherein the free radical solution is formed by an injector, a vortex impeller pump, and dissolution.

* * * * *

UNITED STATES PATENT AND TRADEMARK OFFICE
CERTIFICATE OF CORRECTION

| | | |
|---|---|---|
| PATENT NO. | : 7,264,738 B2 | Page 1 of 1 |
| APPLICATION NO. | : 10/864966 | |
| DATED | : September 4, 2007 | |
| INVENTOR(S) | : Mindong Bai et al. | |

It is certified that error appears in the above-identified patent and that said Letters Patent is hereby corrected as shown below:

<u>Title Page item 57, In the Abstract</u>

Line 11, please replace "OH." with -- OH --

Line 14, please replace "2-20 s" with -- 2-20s --

<u>In the Specification</u>

Col. 8, line 28, please replace "2-20 s" with -- 2-20s --

Col. 8, line 35, please replace "injectors" with -- injector --

Signed and Sealed this

Fifteenth Day of July, 2008

JON W. DUDAS
*Director of the United States Patent and Trademark Office*